(12) United States Patent
Doll et al.

(10) Patent No.: US 6,698,826 B2
(45) Date of Patent: Mar. 2, 2004

(54) ROOF ARRANGEMENT FOR A VEHICLE, PARTICULARLY A MOTOR VEHICLE

(75) Inventors: Dieter Doll, Sindelfingen (DE); Reiner Armbruster, Muehlacker (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/176,400

(22) Filed: Jun. 21, 2002

(65) Prior Publication Data

US 2003/0015891 A1 Jan. 23, 2003

(30) Foreign Application Priority Data

Jun. 23, 2001 (DE) .......................... 101 30 359

(51) Int. Cl.$^7$ ............................................... B60J 7/043
(52) U.S. Cl. ........................... 296/216.08; 296/216.04; 296/216.09; 296/223
(58) Field of Search ................. 296/216.08, 216.01, 296/216.04, 216.06, 216.07, 222, 223

(56) References Cited

U.S. PATENT DOCUMENTS

| | | | | |
|---|---|---|---|---|
| 4,934,753 A | * | 6/1990 | Gajewski | 296/216 |
| 5,154,481 A | * | 10/1992 | Paetz et al. | 296/211 |
| 5,261,722 A | * | 11/1993 | Staley et al. | 296/211 |
| 5,803,534 A | * | 9/1998 | Murkett et al. | 296/222 |
| 6,036,259 A | * | 3/2000 | Hertel et al. | 296/216.01 |
| 6,283,542 B1 | * | 9/2001 | Patz | 296/216.09 |
| 6,513,864 B2 | * | 2/2003 | Bohm et al. | 296/214 |
| 6,513,867 B1 | * | 2/2003 | Bess et al. | 296/216.08 |
| 2002/0145310 A1 | * | 10/2002 | Schatzler et al. | 296/214 |
| 2002/0167202 A1 | * | 11/2002 | Pfalzgraf | 296/214 |
| 2002/0171265 A1 | * | 11/2002 | Armbruster | 296/216.04 |

FOREIGN PATENT DOCUMENTS

| | | | | |
|---|---|---|---|---|
| DE | 3527405 | * | 2/1987 | 296/223 |
| DE | 3614880 A1 | | 11/1987 | |
| DE | 4010942 | * | 7/1991 | 296/223 |
| DE | 19650227 C1 | | 11/1997 | |
| DE | 19630812 A1 | | 2/1998 | |
| DE | 19852383 A1 | | 5/2000 | |
| EP | 0034965 | * | 9/1981 | 296/223 |
| JP | 58-191628 | * | 11/1983 | 296/223 |
| JP | 01-282021 | | 11/1989 | B60J/7/057 |
| JP | 4-228335 | * | 8/1992 | 296/211 |
| JP | 4-303019 | * | 10/1992 | 296/223 |

* cited by examiner

Primary Examiner—Stephen T. Gordon
Assistant Examiner—H. Gutman
(74) Attorney, Agent, or Firm—Crowell & Moring LLP

(57) ABSTRACT

A roof arrangement is particularly useful in a passenger car with a sliding cover which is provided for closing or partially exposing a roof opening and is linked to a lateral guiding device. The roof arrangement also has an element which can be moved with the cover and has a connection line as well as a line guiding device for the connection line. In order to be able to lay the connection line for the element in a simple manner, a screen which can be moved with the cover and which at least partially covers the lateral guiding device is provided. The connection line is guided on the screen.

39 Claims, 2 Drawing Sheets

ROOF ARRANGEMENT FOR A VEHICLE, PARTICULARLY A MOTOR VEHICLE

This application claims the priority of German application 101 30 359.9, filed Jun. 23, 2001.

BACKGROUND AND SUMMARY OF THE INVENTION

The present invention relates to a roof arrangement for a vehicle, particularly a motor vehicle, including at least one cover for closing or at least partially exposing a roof opening, a guiding device to which the at least one cover is laterally linked, and an element which can be moved with the at least one cover and which has a connection line as well as a line guiding device for the connection line.

A roof arrangement of the type mentioned above is known from German Patent Document DE 36 14 880 A1. A cover is provided for closing or at least partially exposing a roof opening. The cover is constructed as a sliding cover and is laterally linked to a guiding device. In order to supply an electric element which is arranged at the movable sliding cover and which can, for example, consume energy, the roof arrangement is equipped with a line guiding device for a connection line of the element. The line guiding device is constructed as a deflection pulley for the connection line. The deflection pulley is disposed on the fixed roof section surrounding the roof opening.

It is an object of this invention to provide a roof arrangement, of the type addressed here, in which the connection line can simply be guided to the element consuming or emitting energy.

This object is achieved by a roof arrangement in which the line guiding device is formed by a screen which can be moved together with the at least one cover and which at least partially covers the guiding device, and in which the connection line is guided on the screen. A process of closing or at least partially opening a roof opening is also claimed.

Principal advantages achieved by the invention include eliminating a separate line guiding device for the connection line so that no additional installation space is required because, during a movement of the cover, the connection line is guided along with the screen. A simple mounting of the line guiding device according to the invention also results, because the connection line can be mounted together with the screen, and the connection line is therefore advantageously also laid when the screen is installed.

The connection line can be fastened to the screen or guided at the screen by simply sliding into a pocket. The pocket can be fixed to the screen by simple devices in a cost-effective manner by sewing or gluing a fabric strip onto the screen.

The arrangement is preferably operated electrically, and includes a driving motor for a therefore electrically operable sun shield, particularly a blind. The motor and the sun shield are preferably fixedly mounted on the sliding cover and movable together with the sliding cover during an adjusting movement. Naturally, other elements, which consume or emit energy, can also be contacted by the guidance of the connection line at the screen. Thus, for example, an electrochromic coating may be provided on the cover as an energy-consuming element which changes the light-transmitting capacity of the cover; this is described, for example, in German Patent Document DE 196 30 812 A1. Energy-emitting variants of an element are, for example, solar cells by which the cover may be equipped; this is the object of German Patent Document DE 198 52 383 A1.

Naturally, the line guiding device according to the invention is not limited to an electric connection line. Connection lines for a gaseous or liquid medium may also be used for energy transport from or to the element.

The invention will be explained in detail by way of embodiments shown in the drawings.

DETAILED DESCRIPTION OF THE INVENTION

Figure 1:
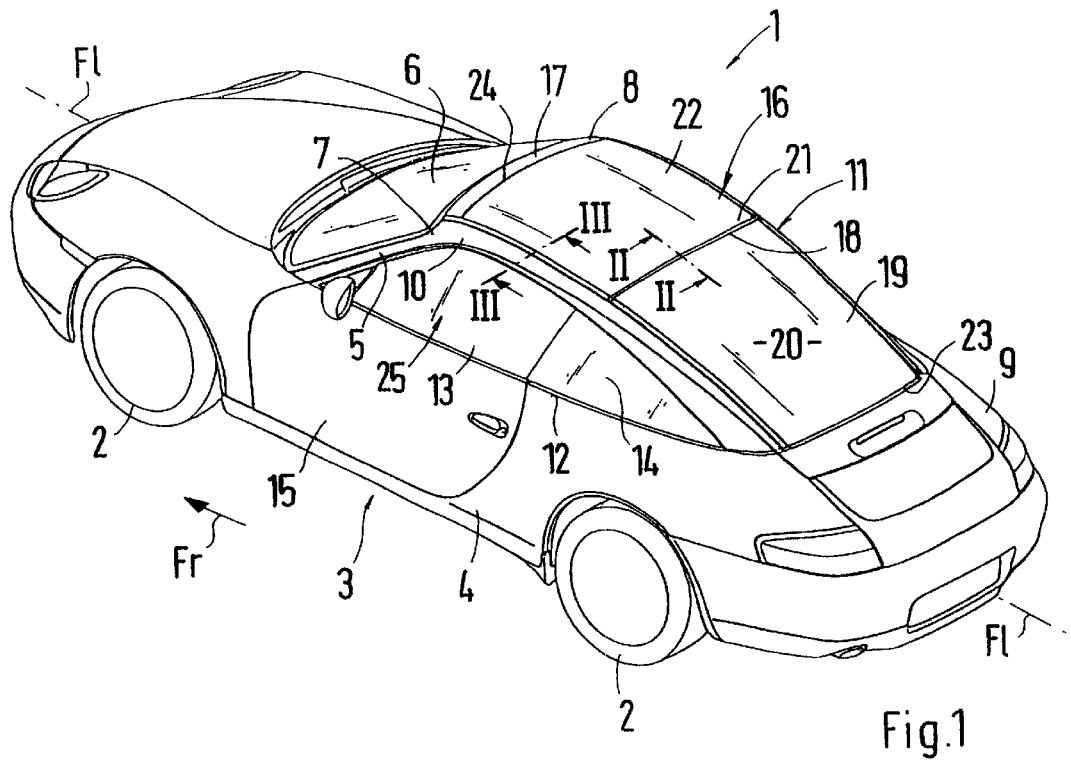
FIG. 1 is a perspective view of a vehicle with a roof arrangement.

FIG. 1 illustrates a vehicle, particularly a passenger car 1, which comprises a body 3 carried by wheels 2. The body 3 has a basic body 4 and a windshield frame 5 into which a windshield 6 is inserted. From its upper corners 7 and 8, lateral roof side members 10 and 11 of the body 3 extend approximately in a curve shape in the direction of the rear 9, so that the body 3 has the shape of a coupe with a fast back. Side window panes 13 and 14 are arranged between the lateral roof side members 10 and 11 and a belt line 12 of the body 3 extending at a distance below the side members 10 and 11. Furthermore, the body 3 is equipped with side doors. Only one of these side doors 15, which carries the preferably frameless side window pane 13, is illustrated.

A roof arrangement 16 is situated between the roof side members 10 and 11. Viewed in the direction of the longitudinal vehicle axis Fl, the roof arrangement extends from an upper transverse frame part 17 of the windshield frame 5 to a forward edge 18 of a tailgate 19 which preferably has a pane 20 or is constructed as a foldable rear window pane and is situated between the roof side members 10 and 11. The roof arrangement may therefore also comprise the tailgate 19. Viewed in the driving direction Fr, the tailgate extends from a rear or rearward edge 21 of a cover 22 of the roof arrangement 16 to a forward edge 23 of the vehicle rear 9. In this case, this forward edge 23 may be situated in the belt line 12. The tailgate 19 or the pane 20 may additionally be assigned to the cover 22 of the roof arrangement 16. The cover 22 is used for closing of and at least partially exposing a roof opening 24 situated between the roof side members 10 and 11, which roof opening 24 is, in addition, arranged between the transverse frame part 17 and the forward edge 18 of the tailgate 19. The roof side members 10 and 11 as well as the transverse frame part 17 and the forward edge 18 bound the roof opening 24. However, the roof opening 24 may also extend from the transverse frame part 17 to the forward edge 23 of the rear part 9, and the pane 20 may be disposed—like the cover 22—in a displaceable manner and thus form another cover of the roof arrangement 16. For exposing the roof opening 24, the forward cover 22 can be lowered downward in the direction of the vehicle interior 25 and can subsequently be slid under the tailgate 19. For opening and closing movement of the cover 22, the cover is laterally linked according to FIG. 3 to a guiding device 26, which will be discussed in detail below.

Figure 2:
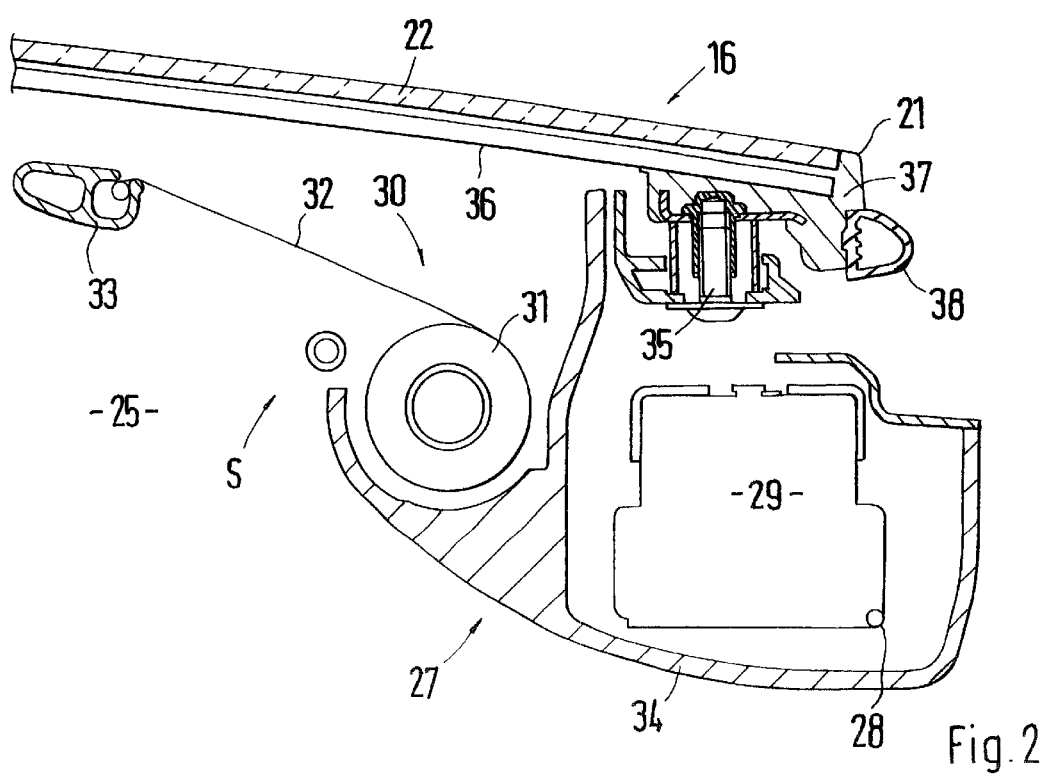
FIG. 2 is a sectional view along line II—II of the roof arrangement of FIG. 1.

As illustrated in FIG. 2, an element 27 which has a connection line 28 and can be moved together with the cover 22 is assigned to the cover 22. The element 27 consumes energy and/or supplies energy, for which the preferably flexible connection line 28 is provided. Furthermore, the element 27 is preferably arranged in the area of the rearward cover edge 21. In the illustrated embodiment, the element 27 is an energy-consuming element which is operated electrically and comprises an electric driving motor 29. In addition, the element 27 has a sun guard S, particularly a blind 30, which can be displaced or activated and deactivated and which has a winding roller 31 and a blind web 32 which is held available on the winding roller 31. At the free end of the blind web 32, a tension hoop 33 is provided, which may be guided in lateral guides which are not shown here. The tension hoop 33 and/or the winding roller 31 is/are driven by the electric motor 29. As mentioned above, the element 27 can be moved together with the cover 22. For this purpose, a coupling may be provided between the movement of the cover 22 and that of the element 27. However, a further development is preferred in which the element 27 is fixedly connected with the sliding cover 22 and is thus necessarily moved along with the cover 22. A housing 34 of the element 27 is connected with the sliding cover 22. For this purpose, a fastening device 35 can be provided which is applied to the housing 34 and the cover 22, particularly to a supporting frame 37 provided on the interior side 36 of the sliding cover 22, on which supporting frame 37 a sealing device 38 may also be fastened which seals off the sliding cover 22 in the direction of the boundary of the roof opening 24.

Figure 3:
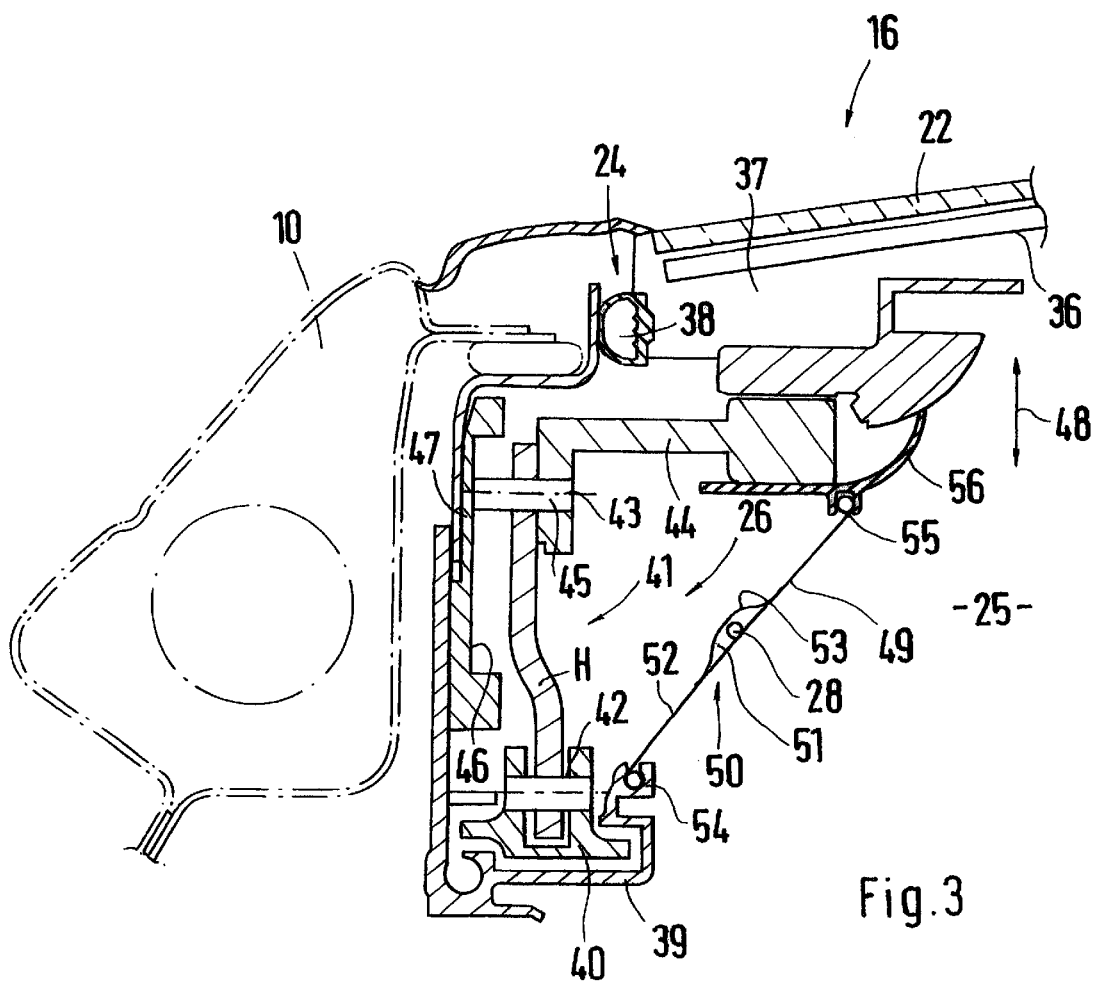
FIG. 3 is a sectional view along line III—III of the roof arrangement according to FIG. 1.

The guiding device 26 for the cover 22 comprises lateral guide rails which are situated at a distance from one another and extend parallel or approximately parallel to the roof side members 10 and 11 and are fixedly arranged on the vehicle. FIG. 3 shows only one guide rail 39 into which a carriage 40 is inserted which is displaceably guided in this manner in the direction of the longitudinal axis Fl of the vehicle. The carriage 40 is connected with the cover 22 by way of a lever arrangement 41 which comprises at least one lever H and which is linked to the guiding carriage 40 in a first swivelling axis 42. A second swivelling axis 43 is arranged in a hook-out arm 44 which is mounted on the cover 22, particularly on its supporting frame 37. The second swivelling axis 43 is formed by a bolt 45 which reaches through the bent hook-out arm 44 as well as through the lever arrangement 41 and is guided with its free end in a control path 46 of a guiding link 47, so that the cover 22 can be lowered during an opening movement in the direction of the arrow 48 toward the interior 25 and, during a closing movement, can be displaced along the direction of the arrow 48 back into the roof opening 24. In the lowered position, the cover can be displaced along the guide rails under the tailgate 19.

The guiding device 26, together with its lever arrangement 41 and the lateral guide rails 39, is covered by a screen 49 toward the interior. The screen 49 can be moved together with the cover 22. The preferably flexible screen 49 can be made of a textile fabric and forms a line guiding device 50 for the connection line 28, which is fastened or guided on the screen. For this purpose, the screen may be equipped with a pocket 51 which may be disposed on the exterior side 52 of the screen 49 facing the guiding device 26. The pocket 51 may also be sewn or glued to the screen 49; the pocket 51 and the screen 49 may also be implemented in one piece. The pocket 51 may also be formed by a fabric strip 53 which is connected with the screen 49. The screen 49 may also comprise two layers between which the pocket 51 is formed. Viewed in the direction of the longitudinal vehicle axis Fl of the vehicle, the pocket 51 may extend along the entire length of the screen 49; however, the pocket may also be provided only in sections. Several pockets 51 may also be provided for fastening the connection line 28 on the screen. Several connection lines may also be guided on the screen 49. Instead of the pocket 51, other fastening devices such as, for example, clamps for the connection line 28 may be mounted on the screen 49. In addition, it is also possible to provide the connection line with a fastening lug or the like.

In the illustrated embodiment, the screen is connected in a non-slidable manner with the cover and is slidably guided in a longitudinal guide 54 implemented as a groove on the guide rail 39. As a result, the screen can be moved along with the cover 22. In particular, the cover-side end 55 of the screen 49 is inserted in a longitudinally extending groove at the supporting frame 37 or at a covering 56 fastened thereto.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A roof arrangement for a vehicle, comprising:
   at least one cover for closing or at least partially exposing a roof opening,
   a guiding device to which the at least one cover is laterally linked, and
   an element which can be moved with the at least one cover and which has a connection line as well as a line guiding device for the connection line,
   wherein said line guiding device is formed by a screen which can be moved together with the at least one cover and which at least partially covers the guiding device,
   wherein the connection line is guided on the screen, and
   wherein the screen is flexible.

2. A roof arrangement for a vehicle, comprising:
   at least one cover for closing or at least partially exposing a roof opening,
   a guiding device to which the at least one cover is laterally linked, and
   an element which can be moved with the at least one cover and which has a connection line as well as a line guiding device for the connection line,
   wherein said line guiding device is formed by a screen which can be moved together with the at least one cover and which at least partially covers the guiding device,
   wherein the connection line is guided on the screen, and
   wherein the screen is a fabric screen.

3. A roof arrangement for a vehicle, comprising:
   at least one cover for closing or at least partially exposing a roof opening,
   a guiding device to which the at least one cover is laterally linked, and
   an element which can be moved with the at least one cover and which has a connection line as well as a line guiding device for the connection line,
   wherein said line guiding device is formed by a screen which can be moved together with the at least one cover and which at least partially covers the guiding device,
   wherein the connection line is guided on the screen, and
   wherein the screen has at least one pocket in which the connection line is situated.

4. The roof arrangement according to claim 3, wherein the at least one pocket is sewn or glued to the screen.

5. The roof arrangement according to claim 3, wherein the at least one pocket is formed by a fabric strip.

6. A roof arrangement for a vehicle, comprising:
at least one cover for closing or at least partially exposing a roof opening,
a guiding device to which the at least one cover is laterally linked, and
an element which can be moved with the at least one cover and which has a connection line as well as a line guiding device for the connection line,
wherein said line guiding device is formed by a screen which can be moved together with the at least one cover and which at least partially covers the guiding device,
wherein the connection line is guided on the screen, and
wherein the screen is slidably guided on the guiding device.

7. A roof arrangement for a vehicle, comprising:
at least one cover for closing or at least partially exposing a roof opening,
a guiding device to which the at least one cover is laterally linked, and
an element which can be moved with the at least one cover and which has a connection line as well as a line guiding device for the connection line,
wherein said line guiding device is formed by a screen which can be moved together with the at least one cover and which at least partially covers the guiding device,
wherein the connection line is guided on the screen,
wherein the guiding device has lateral guide rails on which the at least one cover is guided,
wherein the guiding device has a lever arrangement with at least one lever per guide rail,
wherein said screen is one of a plurality of screens,
wherein one of said screens is provided for each of said guide rails,
wherein the at least one lever is covered by one of said screens, and
wherein each of the guide rails is at least partially covered by one of said screens.

8. A roof arrangement for a vehicle, comprising:
at least one cover for closing or at least partially exposing a roof opening,
a guiding device to which the at least one cover is laterally linked, and
an element which can be moved with the at least one cover and which has a connection line as well as a line guiding device for the connection line,
wherein said line guiding device is formed by a screen which can be moved together with the at least one cover and which at least partially covers the guiding device,
wherein the connection line is guided on the screen, and
wherein the element comprises a displaceable sun guard and a driving motor for the sun guard.

9. A roof arrangement for a vehicle, comprising:
at least one cover for closing or at least partially exposing a roof opening,
a guiding device to which the at least one cover is laterally linked, and
an element which can be moved with the at least one cover and which has a connection line as well as a line guiding device for the connection line,
wherein said line guiding device is formed by a screen which can be moved together with the at least one cover and which at least partially covers the guiding device,
wherein the connection line is guided on the screen, and
wherein the element is fastened in an area of a rearward edge of the cover as viewed in a driving direction.

10. The roof arrangement according to claim 1, wherein the screen is a fabric screen.

11. The roof arrangement according to claim 1, wherein the screen has at least one pocket in which the connection line is situated.

12. The roof arrangement according to claim 2, wherein the screen has at least one pocket in which the connection line is situated.

13. The roof arrangement according to claim 11, wherein the at least one pocket is sewn or glued to the screen.

14. The roof arrangement according to claim 12, wherein the at least one pocket is sewn or glued to the screen.

15. The roof arrangement according to claim 11, wherein the at least one pocket is formed by a fabric strip.

16. The roof arrangement according to claim 12, wherein the at least one pocket is formed by a fabric strip.

17. The roof arrangement according to claim 1, wherein the screen is slidably guided on the guiding device.

18. The roof arrangement according to claim 2, wherein the screen is slidably guided on the guiding device.

19. The roof arrangement according to claim 3, wherein the screen is slidably guided on the guiding device.

20. The roof arrangement according to claim 4, wherein the screen is slidably guided on the guiding device.

21. The roof arrangement according to claim 5, wherein the screen is slidably guided on the guiding device.

22. The roof arrangement according to claim 1, wherein the screen is fastened to the at least one cover.

23. The roof arrangement according to claim 2, wherein the screen is fastened to the at least one cover.

24. The roof arrangement according to claim 3, wherein the screen is fastened to the at least one cover.

25. The roof arrangement according to claim 4, wherein the screen is fastened to the at least one cover.

26. The roof arrangement according to claim 5, wherein the screen is fastened to the at least one cover.

27. The roof arrangement according to claim 6, wherein the screen is fastened to the at least one cover.

28. The roof arrangement according to claim 6, wherein the guiding device has lateral guide rails on which the at least one cover is guided.

29. The roof arrangement according to claim 28, wherein the guiding device has a lever arrangement with at least one lever per guide rail,
wherein said screen is one of a plurality of screens,
wherein one of said screens is provided for each of said guide rails,
wherein the at least one lever is covered by one of said screens, and
wherein each of the guide rails is at least partially covered by one of said screens.

30. The roof arrangement according to claim 1, wherein the connection line is arranged on an exterior side of the screen facing the guiding device.

31. The roof arrangement according to claim 2, wherein the connection line is arranged on an exterior side of the screen facing the guiding device.

32. The roof arrangement according to claim 3, wherein the connection line is arranged on an exterior side of the screen facing the guiding device.

33. The roof arrangement according to claim 4, wherein the connection line is arranged on an exterior side of the screen facing the guiding device.

34. The roof arrangement according to claim 5, wherein the connection line is arranged on an exterior side of the screen facing the guiding device.

35. The roof arrangement according to claim 6, wherein the connection line is arranged on an exterior side of the screen facing the guiding device.

36. The roof arrangement according to claim 7, wherein the connection line is arranged on an exterior side of the screen facing the guiding device.

37. A roof arrangement for a vehicle, comprising:
- at least one cover for closing or at least partially exposing a roof opening,
- a guiding device to which the at least one cover is laterally linked, and
- an element which can be moved with the at least one cover and which has a connection line as well as a line guiding device for the connection line,
- wherein said line guiding device is formed by a screen which can be moved together with the at least one cover and which at least partially covers the guiding device,
- wherein the connection line is guided on the screen,
- wherein the element is electrically operated, and
- wherein the element comprises a displaceable sun guard and a driving motor for the sun guard.

38. A roof arrangement for a vehicle, comprising:
- at least one cover for closing or at least partially exposing a roof opening,
- a guiding device to which the at least one cover is laterally linked, and
- an element which can be moved with the at least one cover and which has a connection line as well as a line guiding device for the connection line,
- wherein said line guiding device is formed by a screen which can be moved together with the at least one cover and which at least partially covers the guiding device,
- wherein the connection line is guided on the screen,
- wherein the element is electrically operated, and
- wherein the element is fastened in an area of a rearward edge of the cover as viewed in a driving direction.

39. The roof arrangement according to claim 8, wherein the element is fastened in an area of a rearward edge of the cover as viewed in a driving direction.

* * * * *